United States Patent
Malkhasyan et al.

(10) Patent No.: US 9,141,368 B2
(45) Date of Patent: Sep. 22, 2015

(54) MANAGING BOOT LOADERS FOR VIRTUAL HARD DISKS

(75) Inventors: Mushegh Malkhasyan, Redmond, WA (US); Paul Roberts, Kirkland, WA (US); Gilbert Wong, Bellevue, WA (US); Stewart MacLeod, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 810 days.

(21) Appl. No.: 13/044,576

(22) Filed: Mar. 10, 2011

(65) Prior Publication Data

US 2012/0233448 A1    Sep. 13, 2012

(51) Int. Cl.
G06F 15/177    (2006.01)
G06F 9/445    (2006.01)
G06F 9/44    (2006.01)

(52) U.S. Cl.
CPC .. G06F 8/63 (2013.01); G06F 8/65 (2013.01); G06F 9/441 (2013.01); G06F 9/4406 (2013.01)

(58) Field of Classification Search
CPC .................................................... G06F 9/4401
USPC ............................................................. 713/2
See application file for complete search history.

(56) References Cited

U.S. PATENT DOCUMENTS

| | | | |
|---|---|---|---|
| 7,340,638 B2 * | 3/2008 | Nicholson et al. | 714/6.11 |
| 7,822,963 B2 * | 10/2010 | Willems | 713/2 |
| 7,827,376 B2 * | 11/2010 | Peterson et al. | 711/173 |
| 2006/0155674 A1 | 7/2006 | Traut et al. | |
| 2006/0265756 A1 | 11/2006 | Campbell et al. | |
| 2007/0186070 A1 | 8/2007 | Federa et al. | |
| 2007/0244938 A1 | 10/2007 | Michael et al. | |
| 2008/0133902 A1 * | 6/2008 | Love | 713/2 |
| 2009/0007105 A1 | 1/2009 | Fries et al. | |
| 2009/0249337 A1 | 10/2009 | Vasilevsky et al. | |
| 2009/0292737 A1 * | 11/2009 | Hayton | 707/200 |
| 2010/0205594 A1 | 8/2010 | Jirka | |

OTHER PUBLICATIONS

"How to use Enhanced Write Filter (EWF) on removable media", Retrieved at<<http://support.microsoft.com/kb/814257>>, Jun. 21, 2004, pp. 3.

"Frequently Asked Questions: Virtual Hard Disks in Windows 7 and Windows Server 2008 R2", Retrieved at<<http://technet.microsoft.com/en-us/library/dd440865(WS.10,printer).aspx>>, Oct. 15, 2010, pp. 5.

* cited by examiner

Primary Examiner — Kim Huynh
Assistant Examiner — Eric Chang
(74) Attorney, Agent, or Firm — Dan Choi; Stein Dolan; Micky Minhas (57) ABSTRACT

The claimed subject matter provides a system or method for managing software changes. An exemplary method comprises creating a reset boot loader, a last known good (LKG) boot loader, and a current boot loader, then pointing the reset boot loader, LKG boot loader, and current boot loader to a parent virtual hard disk (VHD) containing a default master image. An operation to perform is determined, and a service partition is booted into. The LKG boot loader or current boot loader is pointed to a child VHD loaded with another desired image based on the operation selected, and the system is rebooted into the parent VHD or child VHD pointed to by the current boot loader.

20 Claims, 4 Drawing Sheets

MANAGING BOOT LOADERS FOR VIRTUAL HARD DISKS

BACKGROUND

Traditionally, operating systems change state by invoking an update service or installing an entire image of the operating system, including any changes to the operating system. Changing the state of the operating system may include applying updates or reverting to a previous system state. Invoking an update service is less desirable due to the high rate of failure associated with update services, little control of the update, and the undeterministic nature of the update. For example, if a failure occurs during the update, it may halt the operating system, leaving it in a state where it may be impossible to move forward or roll back. Operations that may fail during the update include the execution of a binary, which is a black box operation. Tracking what the binary may change on the image is extremely difficult, and may result in the actual state of the operating system being out of sync with the projected state of the operating system after the update has been applied. The user state/data may be accessible due to the failure of updates or update roll back.

Moreover, the update service may suffer from undeterministic scheduling and non-differentiation of stock keeping units (SKUs). Additionally, manufacturing the update can be problematic when updates for the main operating system are involved. These updates are installed under the security context of the "Trusted Installer," limiting the bits that are installed to those bits that are signed by a private key. Similarly, installing an entire image of the operating system usually involves a reset to factory settings and can be problematic. If the image has been "dirtied," the factory reset may be very operation costly, especially if the entire factory image is to be acquired from the cloud and then copied in place.

System updates are also difficult to apply to a fleet of devices in multiple states, because each device may require a different update, and various numbers of files may be changed due as a result of user interaction. The update to be applied may expect the each of the different devices to be in a particular state before the update is applied. Accordingly, it is difficult for an update to bring a device to a "known" state in order to apply the update, which is typically tested in the lab on just a handful of states.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

The subject innovation relates to managing software changes. An exemplary method provides a method of managing software changes using zero touch management, comprising creating a reset boot loader, a last known good (LKG) boot loader, and a current boot loader, then pointing the reset boot loader, LKG boot loader, and current boot loader to a parent virtual hard disk (VHD) containing a default master image. An operation to perform is determined, and a service partition is booted into. The LKG boot loader or current boot loader is pointed to a child VHD loaded with another desired image based on the operation selected, and the system is rebooted into the parent VHD or child VHD pointed to by the current boot loader.

An exemplary system relates to managing software changes. One exemplary system comprises a processing unit and a system memory. The memory system, which comprises a computer-readable storage medium, stores code configured to direct the processing unit to create a reset boot loader, a last known good (LKG) boot loader, and a current boot loader, then point the reset boot loader, LKG boot loader, and current boot loader to a parent virtual hard disk (VHD) containing a default master image. Also stored in the system memory is code to direct the processing unit to determine an operation to perform, reboot into a service partition, and point the LKG boot loader or current boot loader to a child VHD loaded with another desired image based on the operation selected. Code stored in the system memory may also be configured to cause the processing unit to reboot into the parent VHD or child VHD pointed to by the current boot loader.

Another exemplary embodiment of the subject innovation provides one or more computer-readable storage media that includes code to direct the operation of a processing unit. The code may direct the processing unit to manage software changes. The computer-readable storage media may comprise code that could direct a processing unit to create a reset boot loader, a last known good (LKG) boot loader, and a current boot loader. Code stored on the computer readable storage media may include code configured to point the reset boot loader, LKG boot loader, and current boot loader to a parent virtual hard disk (VHD) containing a default master image, determine an operation to perform, and boot into a service partition. In addition, code stored on the computer-readable storage media may be configured to point the LKG boot loader or current boot loader to a child VHD loaded with another desired image based on the operation selected and reboot into the parent VHD or child VHD pointed to by the current boot loader.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media, such as a computer-readable storage media.

Computer-readable storage media can include, but are not limited to, magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for electrical or electronic signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation relates to zero touch management using native boot virtual hard disks (VHDs) while protecting the VHDs with an enhanced write filter (EWF) in a RAM mode. As a result, the state of the protected VHDs is always known. Zero touch management can be used on various devices in which updates or resets need to be applied with the state of the system known. For example, an operating system may reside on a designated master VHD, with the boot loader pointing to the master VHD. Any updates may be implemented on child VHDs and may be applied off of the master VHD as the parent. As a result, the updates can be very small, as only the information that is changed will be packaged into the update to be stored on the child VHD. EWF provides the ability to write-protect the master run-time image by redirecting all write requests to either a separate disk partition or RAM. The master run-time image stored on the parent VHD maintains the appearance of a writeable run-time image, and the run-time image may be deployed onto read-only media, such as a CD-ROM.

Figure 1:
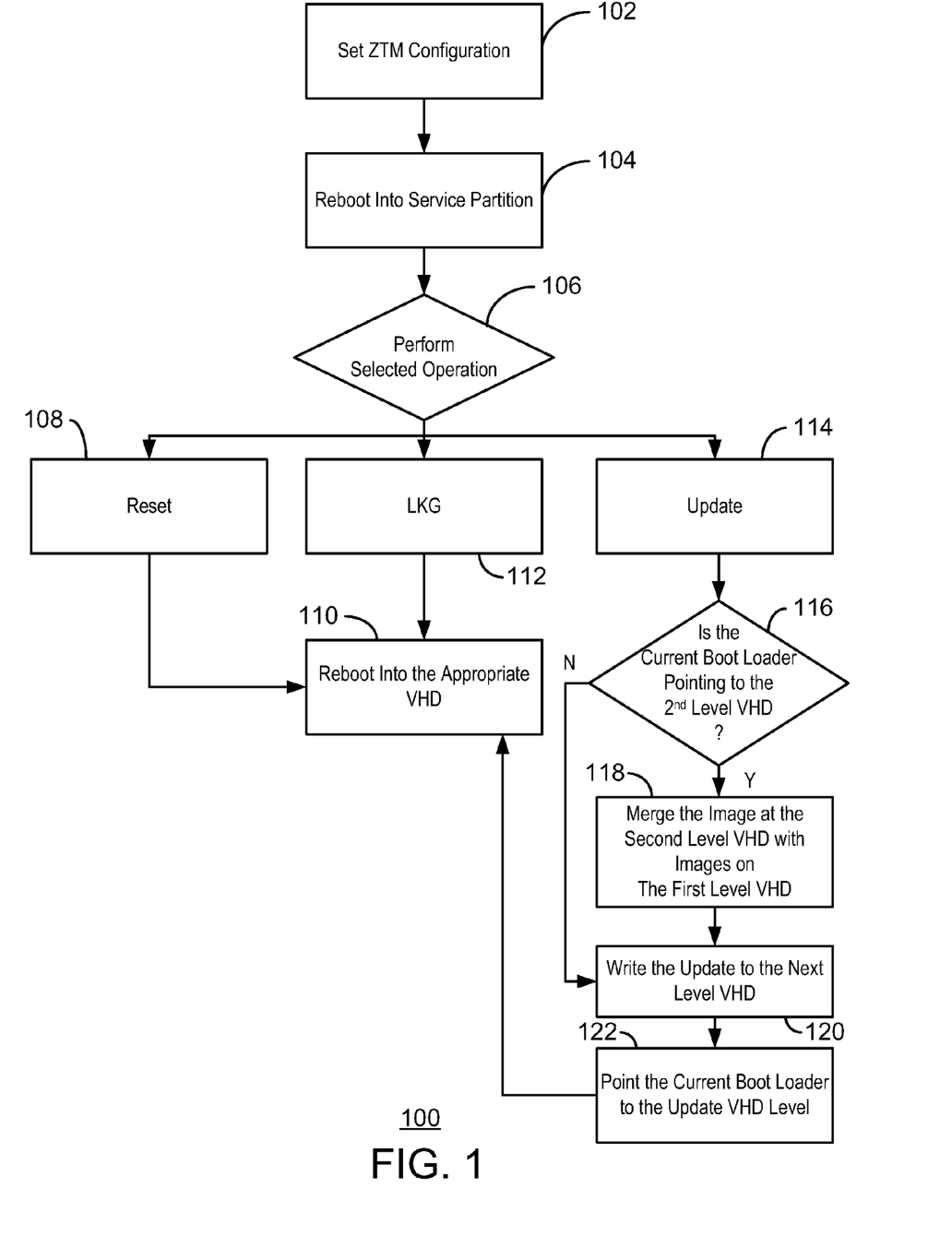
FIG. 1 is a process flow diagram of a method using zero touch management according to the subject innovation.

FIG. 1 is a process flow diagram of a method zero touch management (ZTM) according to the subject innovation. At block 102, a ZTM manager sets a ZTM configuration to reflect the type operation to be performed. Various operations may be performed by ZTM, including a system update, reset, or a reset to the last known good (LKG) system state. Each operation performed may be represented by a boot loader. Accordingly, a reset boot loader, an LKG boot loader, and a current boot loader may be created. The reset boot loader may point to a VHD containing a default master image, which is protected from any writes by EWF. In an exemplary embodiment, the reset boot loader may be used to reset the robot back to the factory default image or settings. The LKG boot loader may point to the last known good update stored on a VHD, and the current boot loader may point to the VHD containing an update image that is used for the current boot.

At block 104, the current boot loader is set to a service partition and the system is rebooted into the service partition. Modifications to a particular image cannot occur while the system is booted into the image, so the system boots into the service image stored on a service partition. The service image may be an additional VHD, allows access to specific services, and typically holds data to be used in restore and recovery scenarios. Once in the service image, the ZTM manager will load the information and then perform the necessary operations.

At block 106, the ZTM manager determines the proper operation to perform, based on the ZTM configuration set at block 102. If the ZTM configuration has been set to reset, the method continues to block 108. If the ZTM configuration has been set to LKG, the method continues to block 112. Finally, if the ZTM configuration has been set to update, the method continues to block 114.

At block 108, a reset is performed. The current boot loader is set to the same VHD as the reset boot loader, which may be the parent VHD containing a default master image. The system is then rebooted into the appropriate VHD at block 110. In this case, the appropriate VHD is the parent VHD containing a default master image.

At block 112, the system reverts to its last known good (LKG) state. The current boot loader is set to the same VHD as the LKG boot loader, which may be the first level (first child) VHD containing all previous updates in one image. The system is then rebooted into the appropriate VHD at block 110. In this case, the appropriate VHD may be the parent VHD containing a default master image, or a first level child VHD containing all previous update images merged onto one VHD.

At block 114, the system performs an update. When using native boot VHD, only two levels of child VHDs are supported. Accordingly, before the update occurs, some VHD images may be merged. At block 116, the current VHD level is determined. If the current boot loader is pointing to the second level (second child) VHD, the method continues to block 118. If the current boot loader is not pointing to the second level child VHD, the method continues to block 120. At block 118, the image stored at the second level child VHD is merged with the image stored at the first level child VHD.

At block 120, the update is written to the next level VHD. For example, if the current boot loader points to the parent VHD, the next level VHD is the first level child VHD and the update is written to the first level VHD. Similarly, if the current boot loader points to the first level child VHD, the next level VHD is the second level child VHD and the update is written to the second level child VHD. If the current boot loader points to the second level child VHD, the image stored on the second level child VHD was previously merged onto the first level child VHD at block 118, and the update may be written to the second level child VHD.

At block 122, the current boot loader is set to the VHD level that was written to at step 120. The method continues to step 110, where the system reboots into the appropriate VHD level which may be set by the current boot loader.

Figure 2:
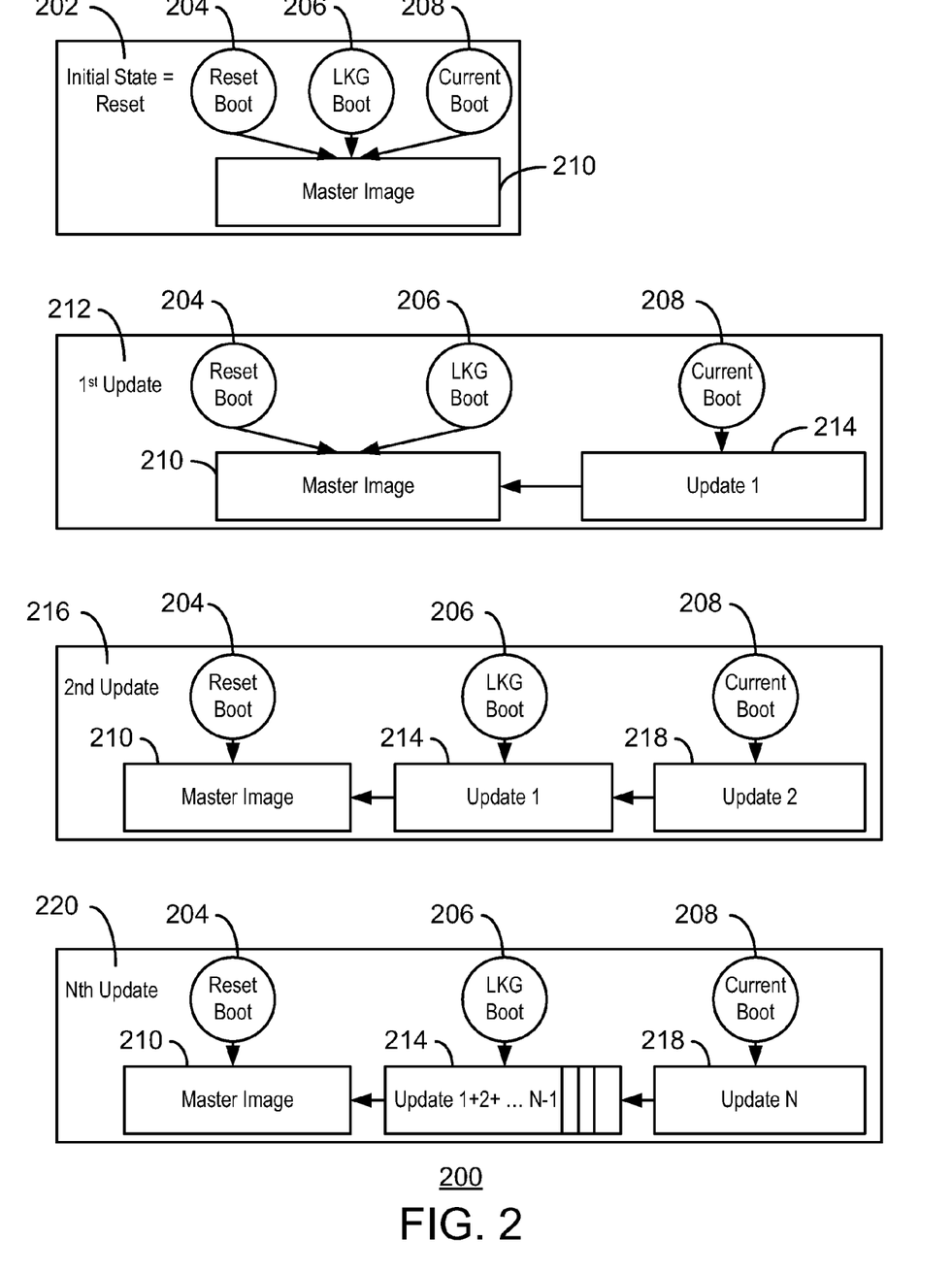
FIG. 2 is a block diagram that is useful in explaining zero touch management according to the subject innovation.

FIG. 2 is a block diagram 200 that is useful in explaining zero touch management according to the subject innovation. At the initial state 202, reset boot loader 204, LKG boot loader 206, and current boot loader 208 all point to the same master image, stored at parent VHD 210. Accordingly, the master image on parent VHD 210 may be protected by EWF, and all write operations on the master image may go to RAM and are reset during any reboot. Additionally, the master image may be used as a base for creating update packages for use on differencing VHDs.

At the state 212, a first update has been performed. The reset boot loader 204 and LKG boot loader 206 still point to the master image on parent VHD 210. The current boot loader 208 now points to the first update image on first level child VHD 214. The first level child VHD 214 may be "applied" to the master image on parent VHD 210. When applying the first update, the first update image will point to the parent, master image on parent VHD 210. Update images are not full VHDs, rather, they are differencing VHDs. They contain a set of changes that are applied to the base master VHD and form a new variation of the master image, which is the desired state after applying the update. The running image has an overlay view, which is a combination of the view through the updated differencing VHD.

At state 216, a second update has been performed. The reset boot loader 204 still points to master image on parent VHD 210, however the LKG boot loader 206 now points to the first update image on first level child VHD 214. The current boot loader 208 now points to a second update image on second level child 218. The second level child VHD 218 may be applied to the first level child VHD 214, which remains applied to the parent VHD 210.

At state 220, a subsequent Nth update has been performed. During each consecutive update, the existing child images may be merged together, stored at the first level child VHD 214, and the new update store at the second level child VHD 222 and applied to the first level child VHD 214. For example, the current boot loader 208 points to the Nth update image on second level child 218. The reset boot loader 204 still points to master image on parent VHD 210, and the LKG boot loader now points to the first through "N−1"th update images, all stored at the first level child VHD 214. In this manner, full reset and LKG reset capability may be achieved by booting into the appropriate image. Merging the images ensures that the depth of the child tree of VHDs is no more than two levels. It is beneficial to merge images in order to keep the number of separate images manageable.

Figure 3:
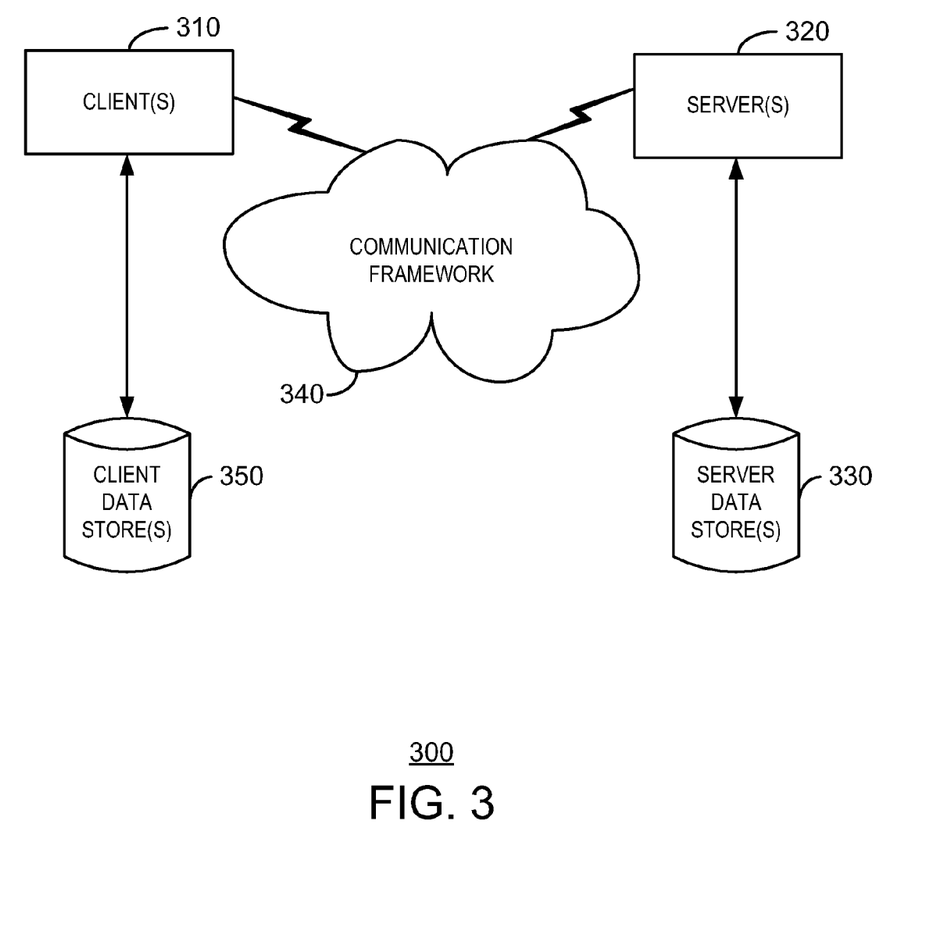
FIG. 3 is a block diagram of an exemplary networking environment wherein aspects of the claimed subject matter can be employed.
Figure 4:
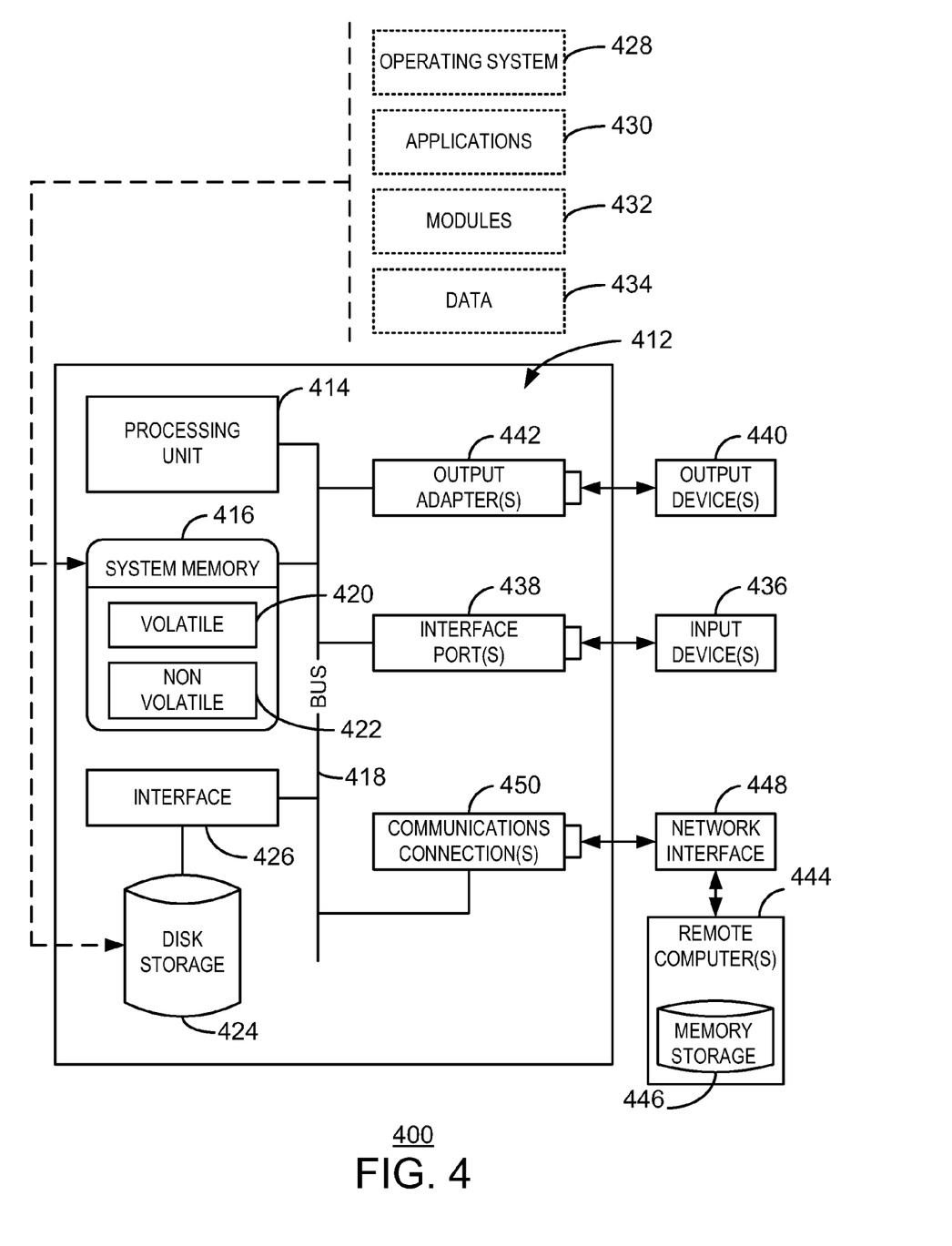
FIG. 4 is a block diagram of an exemplary operating environment that can be employed in accordance with the claimed subject matter.

In order to provide additional context for implementing various aspects of the claimed subject matter, FIGS. 3-4 and the following discussion are intended to provide a brief, general description of a suitable computing environment in which the various aspects of the subject innovation may be implemented. For example, a method using zero touch management, as described in FIG. 1, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 3 is a schematic block diagram of a sample-computing system 300 with which a zero touch management can be implemented. The system 300 includes one or more client(s) 310. The client(s) 310 can be hardware and/or software (e.g., threads, processes, computing devices). The system 300 also includes one or more server(s) 320. The server(s) 320 can be hardware and/or software (e.g., threads, processes, computing devices).

One possible communication between a client 310 and a server 320 can be in the form of a data packet adapted to be transmitted between two or more computer processes. This data packet may contain data to form a trigger or in response to a trigger. The system 300 includes a communication framework 340 that can be employed to facilitate communications between the client(s) 310 and the server(s) 320. The client(s) 310 are operably connected to one or more client data store(s) 350 that can be employed to store information local to the client(s) 310. Information in the data store(s) 350 may include multiple virtual hard disks (VHDs) with update images. The client data store(s) 350 do not have to be in the client(s) 310, but may be located remotely, such as in a cloud server. Similarly, the server(s) 320 are operably connected to one or more server data store(s) 330 that can be employed to store information local to the servers 320. As an example, the client(s) 310 may be computers providing access to the Internet over a communication framework 340. The server(s) 320 may host websites accessed by the client.

With reference to FIG. 4, an exemplary environment 400 for implementing various aspects of the claimed subject matter includes a computer 412. The computer 412 includes a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414. The system bus 418 can be any of several types of bus structure(s) including the memory bus or memory controller, a peripheral bus or external bus, and/or a local bus using any variety of available bus architectures known to those of ordinary skill in the art.

The system memory 416 may include computer-readable storage media comprising volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), or flash memory.

Volatile memory 420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM). The RAM may be used to write protect VHDs according to the subject innovation.

The computer 412 also includes other computer-readable media, such as removable/non-removable, volatile/non-volatile computer storage media. FIG. 4 shows, for example a disk storage 424. Disk storage 424 includes, but is not limited to, devices like a magnetic disk drive, floppy disk drive, tape drive, Jaz drive, Zip drive, LS-100 drive, flash memory card, or memory stick.

In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in the suitable operating environment 400. Such software includes an operating system 428. Operating system 428, which can be stored on disk storage 424, acts to control and allocate resources of the computer system 412.

System applications 430 take advantage of the management of resources by operating system 428 through program modules 432 and program data 434 stored either in system memory 416 or on disk storage 424. It is to be appreciated that zero touch management can be implemented with various operating systems or combinations of operating systems. The browser that the user employs to access the Internet may be a program module 432.

A user enters commands or information into the computer 412 through input device(s) 436. Input devices 436 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 436 connect to the processing unit 414 through the system bus 418 via interface port(s) 438. Interface port(s) 438 include, for example, a serial port, a parallel port, a game port, and a universal serial bus (USB).

Output device(s) 440 use some of the same type of ports as input device(s) 436. Thus, for example, a USB port may be used to provide input to the computer 412, and to output information from computer 412 to an output device 440. Information rendered by the subject innovation may appear on an output device 440.

Output adapter 442 is provided to illustrate that there are some output devices 440 like monitors, speakers, and printers, among other output devices 440, which are accessible via adapters. The output adapters 442 include, by way of illustration and not limitation, video and sound cards that provide a means of connection between the output device 440 and the system bus 418. It can be noted that other devices and/or systems of devices provide both input and output capabilities such as remote computer(s) 444.

The computer 412 can be a server hosting a website in a networked environment using logical connections to one or more remote computers, such as remote computer(s) 444. The remote computer(s) 444 may be client systems configured with web browsers, PC applications, mobile phone applications, and the like, to allow users to browse the Internet, as discussed herein. The remote computer(s) 444 can be a personal computer, a server, a router, a network PC, a workstation, a microprocessor based appliance, a mobile phone, a peer device or other common network node and the like, and typically includes many or all of the elements described relative to the computer 412. For purposes of brevity, only a memory storage device 446 is illustrated with remote computer(s) 444. Remote computer(s) 444 is logically connected to the computer 412 through a network interface 448 and then physically connected via a communication connection 450.

Network interface 448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to the computer 412. The hardware/software for connection to the network interface 448 may include, for exemplary purposes only, internal and external technologies such as, mobile phone switches, modems including regular telephone grade modems, cable modems and DSL modems, ISDN adapters, and Ethernet cards.

An exemplary embodiment of the computer 412 may comprise a client computer with a web browser. An exemplary processing unit 414 for the client may be a computing cluster comprising Intel® Xeon CPUs. The disk storage 424 may comprise an enterprise data storage system, for example, holding thousands of user pages.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method of managing software changes in a computer system, comprising:
    creating a reset boot loader, a last known good (LKG) boot loader, and a current boot loader;
    pointing the reset boot loader, LKG boot loader, and current boot loader to one or more parent virtual hard disks (VHDs) containing a default master image;
    determining an operation to perform and rebooting into a service partition;
    pointing the LKG boot loader or current boot loader to a child VHD loaded with another desired image based on the operation selected; and
    rebooting into the one or more parent VHDs or child VHD pointed to by the current boot loader, the child VHD comprising a differencing VHD representing a set of changes that are applied to form a new variation of the default master image.

2. The method recited in claim 1, comprising resetting the system by pointing the current boot loader to the same VHD as the reset boot loader.

3. The method recited in claim 1, wherein the parent VHDs are protected by enhanced write filter (EWF).

4. The method recited in claim 1, comprising pointing the current boot loader to the same VHD as the LKG boot loader, the VHD containing a single update image or all previous update images merged together.

5. The method recited in claim 1, comprising updating the system by writing an image on a second level child VHD and pointing the current boot loader to the second level child VHD.

6. The method recited in claim 1, comprising updating the system by merging an image on a second level child VHD with an image on a first level child VHD, writing an update image to said second level child VHD, and pointing the current boot loader to the second level child VHD.

7. The method recited in claim 1, comprising updating the system by writing an image to a first level child VHD and pointing the current boot loader to the first level child VHD.

8. The method recited in claim 1, comprising applying the set of changes to form the new variation of the default master image.

9. A system for managing software changes, the system comprising:
    a processing unit; and
    a system memory, wherein the system memory comprises code configured to direct the processing unit to:
        create a reset boot loader, a last known good (LKG) boot loader, and a current boot loader;
        point the reset boot loader, LKG boot loader, and current boot loader to one or more parent virtual hard disks (VHDs) containing a default master image;
        determine an operation to perform and reboot into a service partition;
        point the LKG boot loader or current boot loader to a child VHD loaded with another desired image based on the operation selected; and
        reboot into the one or more parent VHDs or child VHD pointed to by the current boot loader, the child VHD comprising a differencing VHD representing a set of changes that are applied to form a new variation of the default master image.

10. The system recited in claim 9, comprising resetting the system by pointing the current boot loader to the same VHD as the reset boot loader.

11. The system recited in claim 9, wherein the parent VHDs are protected by enhanced write filter (EWF).

12. The system recited in claim 9, comprising pointing the current boot loader to the same VHD as the LKG boot loader, the VHD containing a single update image or all previous update images merged together.

13. The system recited in claim 9, comprising updating the system by writing an image on a second level child VHD and pointing the current boot loader to the second level child VHD.

14. The system recited in claim 9, comprising updating the system by merging an image on a second level child VHD with an image on a first level child VHD, writing an update image to said second level child VHD, and pointing the current boot loader to the second level child VHD.

15. The system recited in claim 9, comprising updating the system by writing an image to a first level child VHD and pointing the current boot loader to the first level child VHD.

16. One or more computer-readable storage memory devices, comprising code configured to direct a processing unit to:
    creating a reset boot loader, a last known good (LKG) boot loader, and a current boot loader;

pointing the reset boot loader, LKG boot loader, and current boot loader to one or more parent virtual hard disks (VHDs) containing a default master image;

determining an operation to perform and rebooting into a service partition;

pointing the LKG boot loader or current boot loader to a child VHD loaded with another desired image based on the operation selected; and rebooting into the one or more parent VHDs or child VHD pointed to by the current boot loader, the parent VHDs being pointed to by the reset boot loader, LKG boot loader, and the current boot loader, and the child VHD being pointed to by the LKG boot loader or the current boot loader, the child VHD comprising a differencing VHD representing a set of changes that are applied to form a new variation of the default master image.

17. The one or more computer-readable storage memory devices recited in claim 16, comprising resetting the system by pointing the current boot loader to the same VHD as the reset boot loader, said VHD being protected by enhanced write filter (EWF).

18. The one or more computer-readable storage memory devices recited in claim 16, comprising pointing the current boot loader to the same VHD as the LKG boot loader, the VHD containing a single update image or all previous update images merged together.

19. The one or more computer-readable storage memory devices recited in claim 16, comprising updating the system by writing an image on a second level child VHD and pointing the current boot loader to the second level child VHD.

20. The one or more computer-readable storage memory devices recited in claim 16, comprising updating the system by merging an image on a second level child VHD with an image on a first level child VHD, writing an update image to said second level child VHD, and pointing the current boot loader to the second level child VHD.

* * * * *